US012726056B2

(12) United States Patent
Seo et al.

(10) Patent No.: US 12,726,056 B2
(45) Date of Patent: Sep. 1, 2026

(54) MOTOR STRUCTURE AND SPLIT CORE STACKING METHOD

(71) Applicant: HYUNDAI MOBIS CO., LTD., Seoul (KR)

(72) Inventors: Yeong Woo Seo, Yongin-si (KR); Jeong Min Moon, Suwon-si (KR); Do Hyun Kim, Anyang-si (KR); Jong Jin Park, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 263 days.

(21) Appl. No.: 18/541,190

(22) Filed: Dec. 15, 2023

(65) Prior Publication Data

US 2024/0213828 A1 Jun. 27, 2024

(30) Foreign Application Priority Data

Dec. 22, 2022 (KR) ........................ 10-2022-0181983

(51) Int. Cl.
*H02K 1/16* (2006.01)
*H02K 1/20* (2006.01)
*H02K 9/19* (2006.01)

(52) U.S. Cl.
CPC ................. *H02K 1/16* (2013.01); *H02K 1/20* (2013.01); *H02K 9/19* (2013.01); *H02K 2213/03* (2013.01)

(58) Field of Classification Search
CPC ............ H02K 1/148; H02K 1/20; H02K 9/19; H02K 2201/06
See application file for complete search history.

(56) References Cited

U.S. PATENT DOCUMENTS

2007/0267932 A1* 11/2007 Ashikawa .............. H02K 3/522 310/179
2009/0085415 A1* 4/2009 Ionel ...................... H02K 1/148 310/43
2009/0134739 A1* 5/2009 Akita .................. H02K 15/022 310/216.004
2010/0090560 A1* 4/2010 Myojin .................. H02K 15/02 310/216.043

(Continued)

FOREIGN PATENT DOCUMENTS

CN 110492626 A * 11/2019 ............... H02K 1/12
WO WO-2023248466 A1 * 12/2023 ............... H02K 1/18

OTHER PUBLICATIONS

CN-110492626-A Machine Translation (Year: 2019).*
WO-2023248466-A1 Machine Translation (Year: 2023).*

*Primary Examiner* — Oluseye Iwarere
*Assistant Examiner* — Masoud Vaziri
(74) *Attorney, Agent, or Firm* — Morgan, Lewis & Bockius LLP

(57) ABSTRACT

A motor structure includes a cylinder-shaped motor housing having a hollow, a stator core accommodated inside the motor housing and including a plurality of stacked split cores each including a ring-shaped yoke portion and a plurality of teeth portions protruding from the yoke portion and having an arc-shape, a coil wound around the teeth portion, wherein the split cores include first split cores combined to form a first layer, second split cores combined to form a second layer stacked on the first layer, and a boundary between the first split cores and a boundary between the second split cores do not match.

10 Claims, 13 Drawing Sheets

(56) References Cited

U.S. PATENT DOCUMENTS

| | | | | |
|---|---|---|---|---|
| 2010/0213785 | A1* | 8/2010 | Nagai | H02K 1/148<br>310/216.043 |
| 2014/0091671 | A1* | 4/2014 | Irie | H02K 15/021<br>29/596 |
| 2019/0140500 | A1* | 5/2019 | Takizawa | H02K 7/006 |
| 2020/0313473 | A1* | 10/2020 | Yamada | H02K 1/148 |

* cited by examiner

MOTOR STRUCTURE AND SPLIT CORE STACKING METHOD

CROSS-REFERENCE TO RELATED APPLICATIONS

This application claims priority under 35 U.S.C. § 119 to Korean Patent Application No. 10-2022-0181983, filed on Dec. 22, 2022, in the Korean Intellectual Property Office, the disclosure of which is incorporated herein by reference in its entirety.

TECHNICAL FIELD

The following disclosure relates to a motor structure and a split core stacking method, and in particular, to a motor structure including an arc-shaped split core and a split core stacking method.

BACKGROUND

Hybrid vehicles drive in an electric vehicle (EV) mode, which is a pure electric vehicle mode using only power from a driving motor, or in a hybrid electric vehicle (HEV) mode, which uses both torque of an engine and a driving motor as power. As described above, a driving motor used as a power source of vehicles includes a stator core and a rotor core, the stator core is coupled to a motor housing, and the rotor core is disposed inside the stator core.

The stator core includes a core body formed of an electrical sheet, coils wound around the core body, and end coils disposed above and below the core body.

The stator core is provided by stacking ring-shaped tubular cores or by combining a plurality of arc-shaped split cores into a ring shape and then stacking the same. Tubular cores have a relatively large amount of electrical steel scraps to be discarded in addition to the shape of the tubular core in the manufacturing process using press working, compared to split cores.

In order to solve the problem, a method of forming a magnetic path by pressing thin arc-shaped split cores and then stacking the split cores in an axial direction is adopted. However, although the tubular cores are not prevented from being separated, the split cores have the inconvenience of using an additional structure surrounding the split cores or bolting or welding the boundary between the split cores so that the split cores are not separated from each other.

FIG. 1 shows a coupling structure of a general split core 25. Referring to FIG. 1, a support ring 30 is used as a method of combining the split cores. When the split cores 25 are stacked by matching boundary lines thereof as shown in FIG. 1, stacking of the split cores 25 may be facilitated, but the split cores 25 may not be fixed without the support ring 30. Additional provision of the support ring 30 is costly and time consuming, so there is a need for improvement.

Meanwhile, in the stator core, high-temperature heat is generated according to current applied to the coil. In addition, an eddy current is generated in the stator core by a counter-electromotive voltage due to a change in magnetic flux generated according to a rotating magnet and current applied to the coil. Therefore, since high-temperature heat is generated in the stator core of the driving motor mounted in vehicles due to such current, the driving motor should be essentially cooled to prevent damage caused by heat and to ensure stable operation continuously.

There are two methods of cooling the driving motor: an oil cooling method using oil and a water cooling method using cooling water. Among them, in the oil cooling method, a cooling pipe for cooling the stator core is installed between the stator core and the motor housing. Specifically, the cooling pipe includes a pair of straight pipes and a pair of circular pipes, and the straight pipes extend parallel to the coupling portion to spray oil to the stator core to cool the stator core. For cooling, a flow path through which oil may flow may be formed on an outer circumferential surface of the stator core.

However, there is a problem in that the stator core is not evenly cooled simply by forming the flow path on the outer circumferential surface of the stator core.

SUMMARY

An exemplary embodiment of the present invention is directed to providing a motor structure in which split cores are easily coupled to each other, and a split core stacking method.

Another exemplary embodiment of the present invention is directed to providing a motor structure in which the entire circumference of a stator core is efficiently cooled, and a split core stacking method.

The tasks of the present invention are not limited to the tasks mentioned above, and other tasks not mentioned will be clearly understood by those skilled in the art from the description below.

In one general aspect, a motor structure is provided. The motor structure includes: a cylinder-shaped motor housing having a hollow; a stator core accommodated inside the motor housing and including a plurality of stacked split cores including: a first layer including first split cores; and a second layer including second split cores, the second layer is stacked on the first layer, wherein a boundary between the first split cores and a boundary between the second split cores do not match, and each of the first and second split cores have an arc-shape and include: a ring-shaped yoke portion; and a plurality of teeth portions protruding from the yoke portion; and a coil wound around the teeth portion.

The first split cores and the second split cores may be the same, and when an intersection angle between the first layer and the second layer is θ, a number of slots formed by combining the teeth portions is x, and a number of split cores constituting the first layer or the second layer is y, θ may satisfy the following two equations.

$$\theta = (360°/x) \times n,$$

$$\theta \neq (360°/y) \times n, \text{ and}$$

$n$ is a natural number.

The plurality of stacked split cores may further include: a third layer including third split cores, the third layer is stacked on the second layer; and a fourth layer including fourth split cores, the fourth layer is stacked on the third layer, and when viewed from above, the boundary between the first split cores and a boundary between the third split cores match, and the boundary between the second split cores and a boundary between the fourth split cores match.

The first layer and the second layer may be repeatedly stacked.

The first split cores and the second splits core may be identical.

The first split cores and the second split cores may have different lengths.

A flow path portion may be at the boundary between the split cores among the plurality of stacked split cores.

The flow path portion may penetrate from one end of the yoke portion to the other end of the yoke portion in a radial direction of the yoke portion.

The flow path portion may include a step including a groove disposed in the radial direction of the yoke portion, and steps of the split cores among the plurality of stacked split cores may contact each other.

The step may have a through hole penetrating the step in an axial direction of the plurality of stacked split cores.

The yoke portion may have a through hole penetrating the yoke portion in the axial direction of the plurality of stacked split cores.

In another general aspect, a split core stacking method is provided. The method of stacking a split core having an arc shape and including a yoke portion and a plurality of teeth portions protruding from the yoke portion to form a plurality of stacked split cores to constitute a stator core, includes: combining a plurality of first split cores to form a ring-shaped first layer, and combining a plurality of second split cores to form a ring-shaped second layer on the first layer so that, with respect to a central axis of the stator core, a boundary of the second split cores is at intersection angle θ from a boundary of the first split cores.

The first split cores and the second split cores may be the same, and when a number of slots formed by combining the teeth portions is x, and a number of split cores constituting the first layer or the second layer is y, θ may satisfy the following two equations.

$$\theta = (360°/x) \times n,$$

$$\theta \neq (360°/y) \times n, \text{ and}$$

$n$ is a natural number.

The method may further include repeating the stacking of the first layer and the second layer.

The first split cores and the second split cores may have different lengths.

The method may further include providing a flow path portion at the boundary between the split cores among the plurality of stacked split cores.

The flow path portion may penetrate from one end of the yoke portion to the other end of the yoke portion in a radial direction of the yoke portion.

The flow path portion may include a step formed by a groove formed in a radial direction of the yoke portion, and steps of the split cores among the plurality of stacked split cores may contact each other.

The step may have a through hole penetrating the step in an axial direction of the plurality of stacked split cores.

The yoke portion may have a through hole penetrating the yoke portion in the axial direction of the plurality of stacked split cores.

Other features and aspects will be apparent from the following detailed description, the drawings, and the claims.

DETAILED DESCRIPTION OF EXEMPLARY EMBODIMENTS

Figure 1:
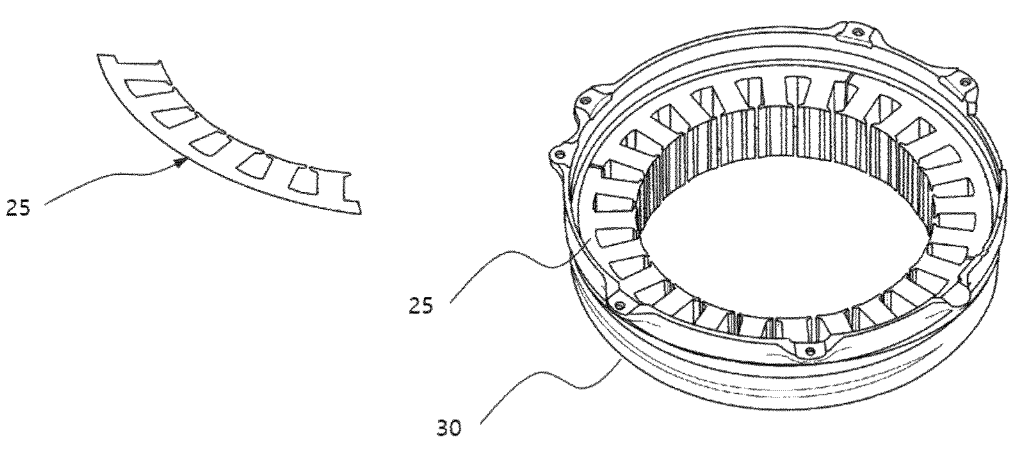
FIG. 1 shows a general coupling structure of a split core.

Hereinafter, exemplary embodiments of the present invention will be described in detail with reference to the accompanying drawings such that those skilled in the art may easily put the invention into practice. The invention may be embodied in various forms and is not limited to the exemplary embodiments which are described below. For the purpose of clear description of the invention, parts which are not described are omitted and like parts in the specification are referenced by like reference numerals.

In the entire specification, when it is mentioned that an element is "connected" to another element, this mention includes a case in which both elements are "directly connected to each other" and a case in which both elements are "indirectly connected to each other" with still another element interposed therebetween.

In the entire specification, when it is mentioned that an element is located "on" another element, this mention includes a case in which an element comes in contact with another element and a case in which still another element is present between both elements.

In the entire specification, when it is mentioned that an element "includes" another element, this means that the element may further include still another element without excluding still another element unless oppositely described. Terms, "about," "substantially," and the like indicating degrees, which are used in the entire specification when manufacturing errors and material-allowable errors specific to the mentioned meaning are given, are used to prevent an unconscientious infringer from improperly using the disclosed details. Terms, such as "step of doing" or "step of" indicating degrees, which are used in the entire specification do not mean "step for."

Hereinafter, preferred exemplary embodiments of the present invention will be described in detail with reference to the accompanying drawings and the description below. However, the present invention is not limited to the exemplary embodiments described herein and may be embodied in other forms. Like reference numbers indicate like elements throughout the specification.

Hereinafter, a transmission device for an electric vehicle according to an exemplary embodiment of the present invention will be described.

Figure 2:
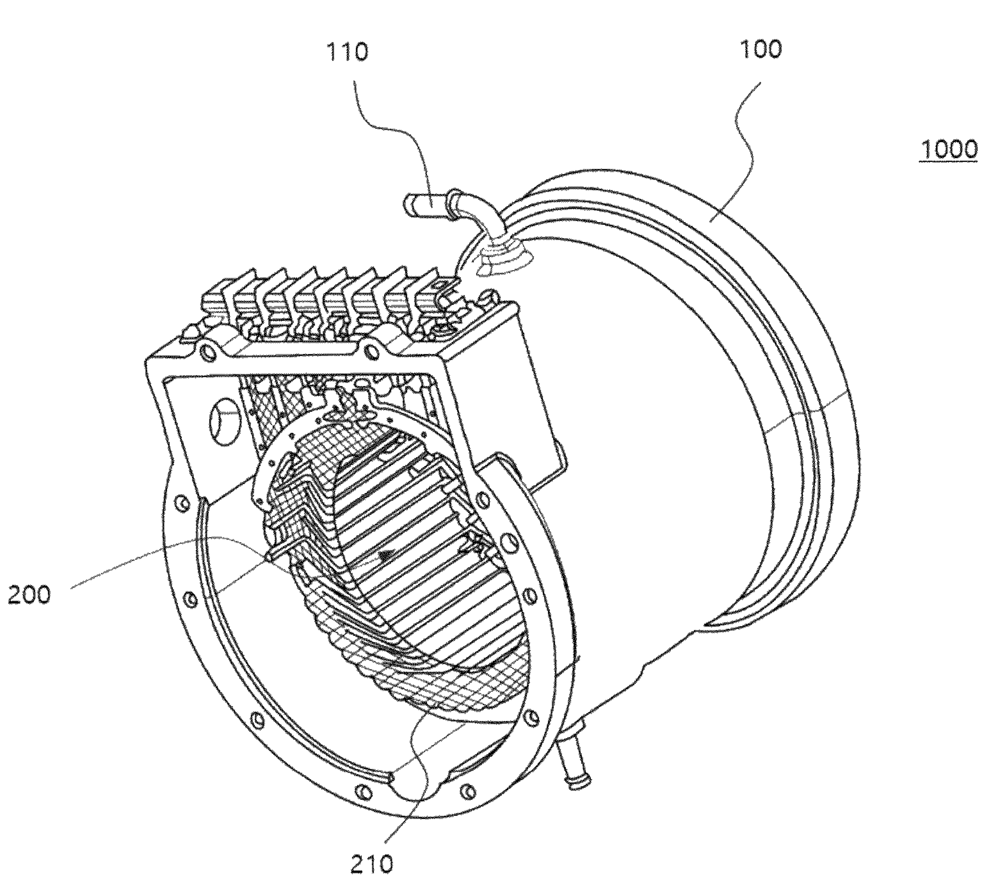
FIG. 2 shows a motor structure according to an exemplary embodiment of the present invention.

FIG. 2 is a schematic diagram of a motor structure 1000 according to an exemplary embodiment of the present invention.

Referring to FIG. 2, the motor structure 1000 according to an exemplary embodiment of the present invention includes a motor housing 100, a stator core 200, and a cooling pipe 110.

The motor housing 100 has a hollow cylindrical shape and includes a stator core 200 therein. In an example, an inner diameter of the motor housing 100 may be provided to match an axis of rotation around which the stator core 200 rotates. However, alternatively, the motor housing 100 may be formed to have various shapes to correspond to the above standard or capacity or a mounting position at which the motor housing 100 is used, and accordingly, the shape of the motor housing 100 may not be limited to a specific shape, except a fixing structure of the motor housing 100 and the stator core 200 of the present exemplary embodiment.

In the stator core 200, a plurality of concentric arc-shaped split cores 210 (refer to FIG. 3) are stacked. A coil 201 is wound around the stator core 200, and a rotor system (not shown) is formed by magnetic flux generated by the coil 201. The stator core 200 may be provided in a cylindrical shape with one end and the other end communicating with each other. A rotor (not shown) core may be provided to be located inside or outside the stator core 200. When an electromagnetic field is generated according to power supply, the stator core 200 and the rotor interact with each other and the rotor (not shown) rotates from the stator core 200.

The cooling pipe 110 receives cooling fluid from the outside and supplies the cooling fluid to the stator core 200. In an example, the cooling fluid may be provided as oil. Alternatively, the cooling fluid may be provided as cooling water or gas. The cooling pipe 110 may spray a cooling fluid. The method by which the cooling pipe 110 supplies cooling fluid is not limited thereto, and any method in which the cooling fluid may flow along a cooling path may be used.

Figure 3:
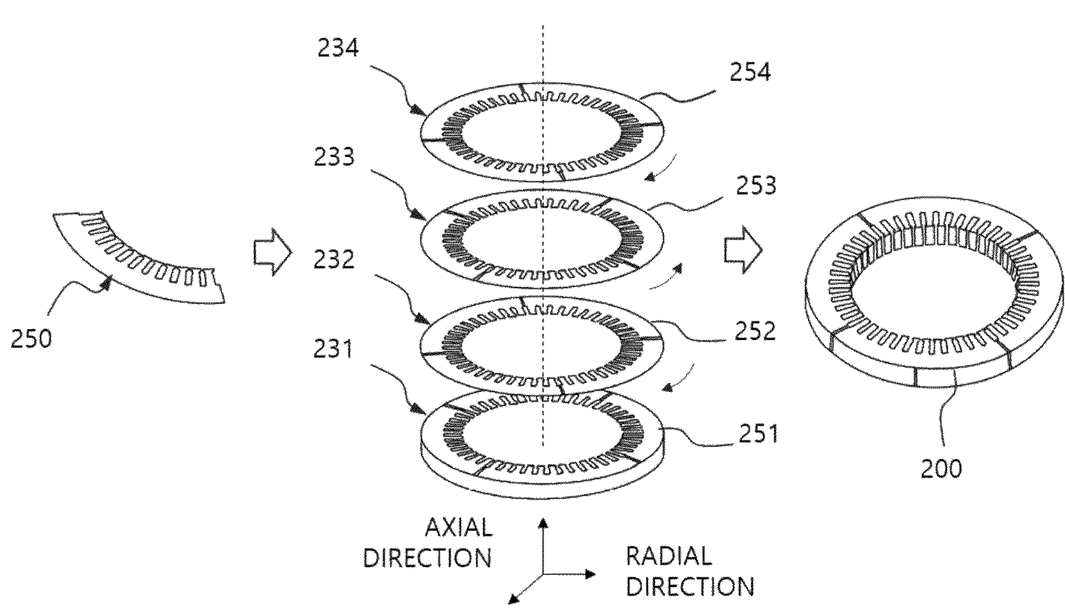
FIG. 3 shows the appearance of a split core according to an exemplary embodiment of the present invention.

FIG. 3 shows the appearance of the split core 250 according to an exemplary embodiment of the present invention. Referring to FIG. 3, the split core 250 has an arc shape and has a yoke portion 2501 and a teeth portion 2503. The teeth portion 2503 protrudes from the yoke portion 2501 toward an inner diameter of the split core 250. A coil 210 is wound around the teeth portion 2503, and the teeth portions 2503 are combined to form a slot 2502. The split cores 250 are combined to form a ring-shaped split core 250 layer. A plurality of layers are stacked to form the stator core 200.

In an example, boundaries of the split cores 250 constituting adjacent layers may be provided not to match. For example, the split core 250 includes a first layer 231 and a second layer 232 stacked on the first layer 231. A plurality of first layers 231 and a plurality of second layers 232 may be alternately stacked. The first split cores 251 are combined to form the first layer 231, and the second split cores 252 are combined to form the second layer 232. In this case, a boundary between the first split cores 251 and a boundary between the second split cores 252 may not match. In an example, the first split core 251 and the second split core 252 may be provided identically. This is to prevent fixation between the split cores 250 from being impossible when the boundaries between the split cores 250 match. Since the adjacent split cores 250 are provided so that the boundaries therebetween do not match, the split cores 250 vertically contacting each other have a fixing force, and accordingly, the split cores 250 constituting the stator core 200 may be coupled to each other and fixed as a whole.

In an example, the split core 250 includes third split cores 253 combined to form a third layer 233 stacked on the second layer 232 and fourth split cores 254 combined to form a fourth layer 234 stacked on the third layer 233, and when viewed from above, a boundary between the first split cores 251 and a boundary between the third split cores 253 may match, and a boundary between the second split cores 252 and a boundary between the fourth split cores 254 may match.

In an example, all of the split cores 250 provided in each layer may be provided to be the same. Alternatively, the split cores 250 provided in the first layer 231 and the third layer 233 may be the same, and the split cores 250 provided in the second layer 232 and the fourth layer 234 may be the same.

In the above example, it is described that the first split core 251 constituting the first layer 231 and the second split core 252 constituting the second layer 232 are provided to be the same. However, alternatively, the first split core 251 and the second split core 252 may be provided to have different lengths.

Figure 4:
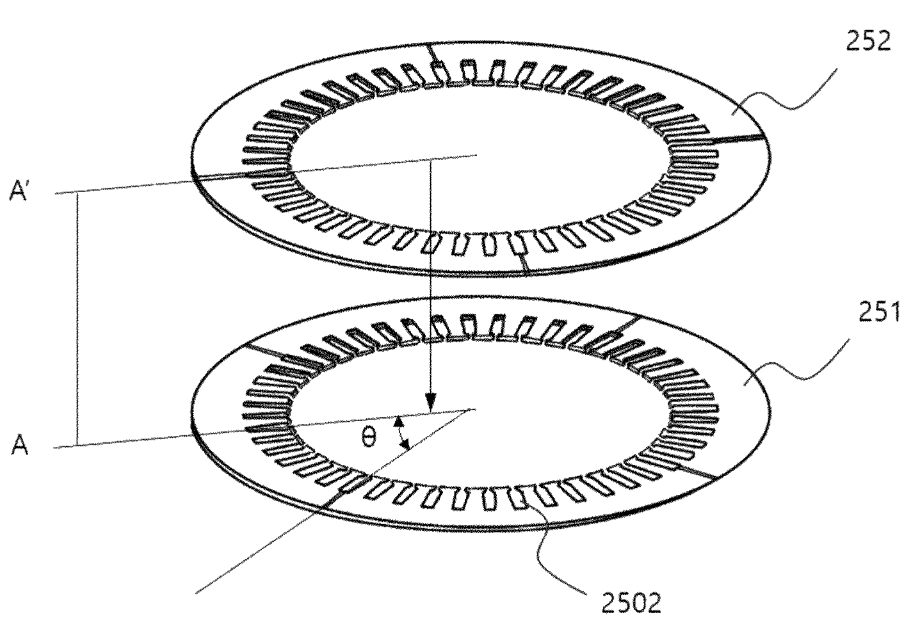
FIG. 4 is a view illustrating a split core stacking method according to an exemplary embodiment of the present invention.

FIG. 4 is a view illustrating a stacking method of split cores 250 according to an exemplary embodiment of the present invention. Referring to FIG. 4, in an example, the first split core 251 and the second split core 252 are the same, and an intersection angle between the first layer 231 and the second layer 232 is θ, the number of slots 2502 formed by combining the teeth portions 2503 is x, and the number of split cores 250 constituting the first layer 231 or the second layer 232 is y. At this time, θ may satisfy the following two equations. The intersection angle refers to a central angle formed by a boundary line A between the split cores 250 located above or below and a boundary line A' between the split cores 250 located below or above based on the center of the split cores 250 when the layer 252 of the split core 250 located above is projected to the layer 251 located below (or when the layer 251 of the split core 250 located below is projected to the layer 252 located above).

$$\theta = (360°/x) \times n \qquad \text{Equation 1}$$

$$\theta \neq (360°/y) \times n \qquad \text{Equation 2}$$

Equation 1 means that θ should be a multiple of the angle between the slots 2502 because the positions of the slots 2502 should match when the layers 251, 252, 253, 254 . . . of the split core 250 are stacked. In an example, four split cores 250 may be provided to form one layer (251, 252, 253, 254 . . . ). In this case, the number y of split cores 250 is four. Assuming that x is 48, θ should be given as a multiple of 7.5 degrees.

Equation 2 means that, when the layers 251, 252, 253, and 254 of the split cores 250 are stacked, the boundaries of the split cores provided in each layer 251, 252, 253, 254 . . . should not match, so e should not be a multiple of the central angle of one split core 250. For example, assuming that y is 4, θ should not be a multiple of 90 degrees.

A plurality of first split cores 251 may be combined to form the ring-shaped first layer 231, and a plurality of second split cores 252 may be combined on the first layer 231 so that the boundary of the second split core 252 has an intersection angle θ from the boundary of the first split core 251 based on a center axis of the stator core 200, to form the ring-shaped second layer 232. At this time, θ satisfies Equations 1 and 2 above.

Figure 5:
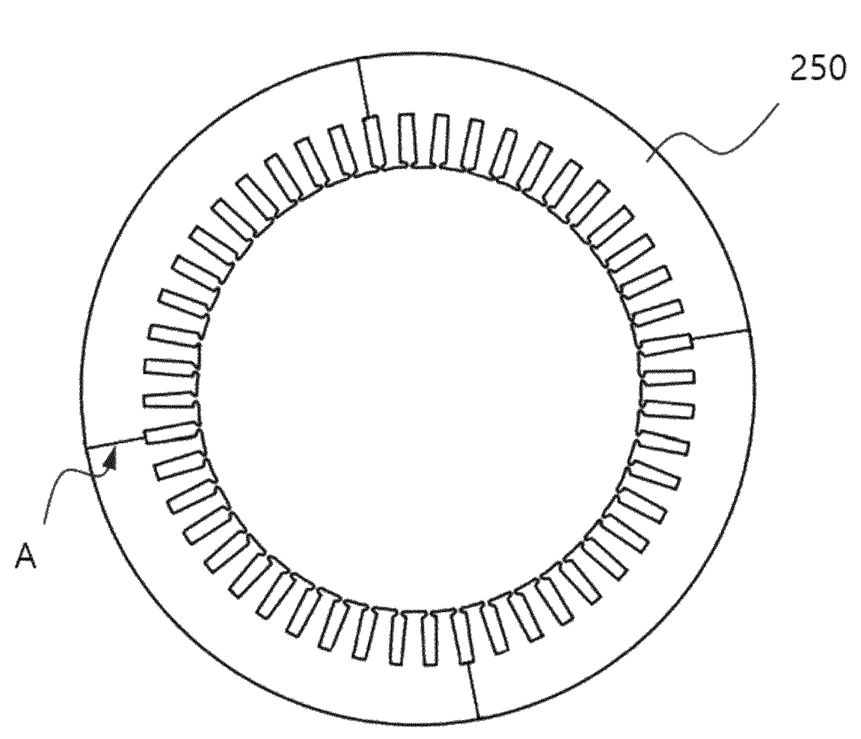
FIG. 5 shows the appearance of a split core according to an exemplary embodiment of the present invention.

FIG. 5 shows the appearance of the split core 250 according to an exemplary embodiment of the present invention. Referring to FIG. 5, the boundaries A between the split cores

250 may be provided to contact each other. Accordingly, the split cores 250 may be easily assembled without a separate device.

Figure 6:
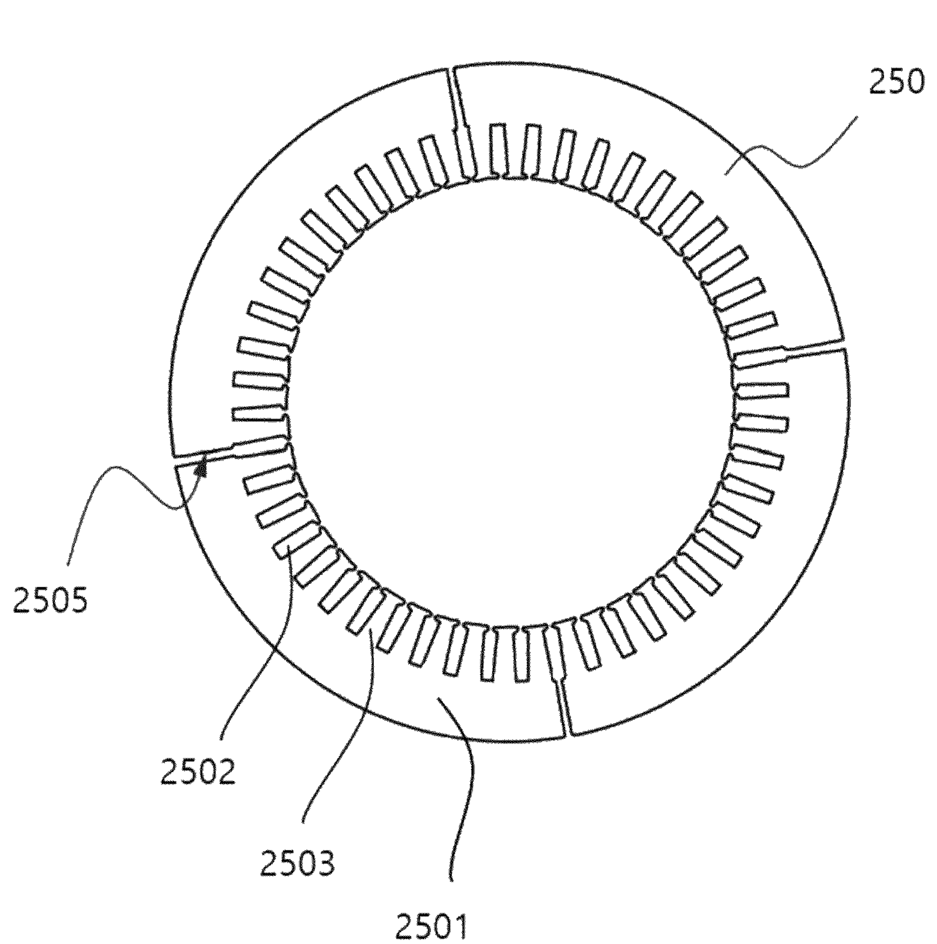
FIGS. 6 and 7 show the appearance of a split core according to another exemplary embodiment of the present invention.
Figure 7:
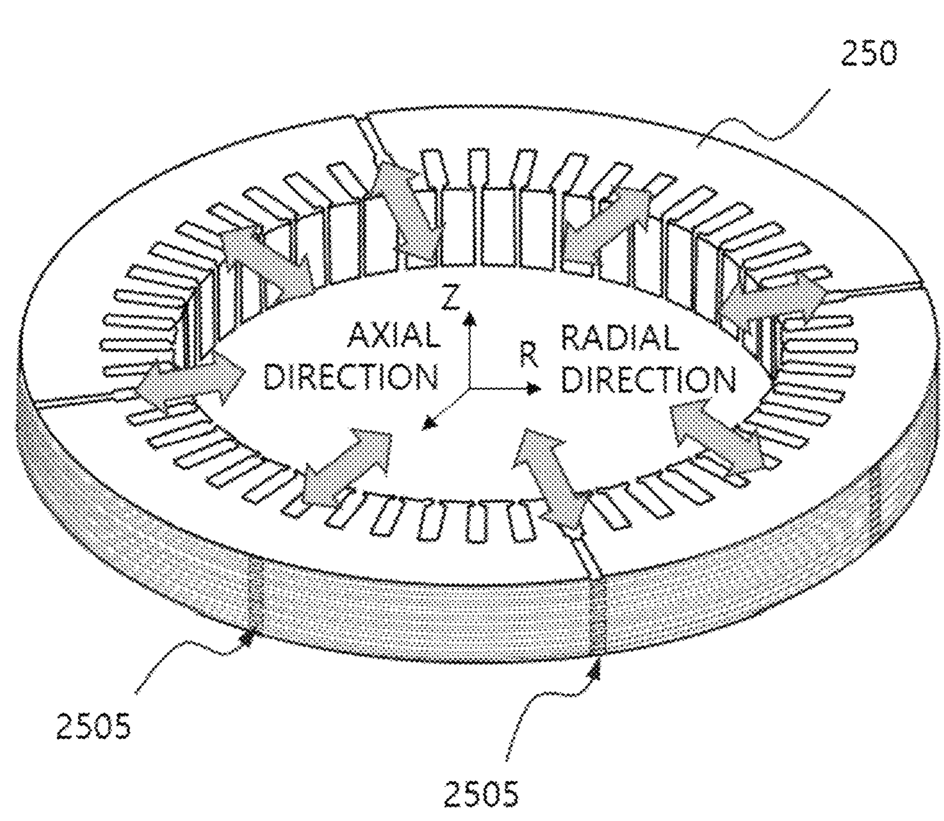

FIGS. 6 and 7 show the appearance of the split core 250 according to another exemplary embodiment of the present invention. Referring to FIG. 6, a flow path portion 2505 may be provided at the boundary between split cores 250. In an example, the flow path portion 2505 may be provided to penetrate from one end to the other end of the yoke portion 2501 in a radial direction of the yoke portion 2501. In this manner, in order to form the flow path portion 2505, a passage may be formed between the split cores 250 by reducing the size of the boundary portions in which the split cores 250 contact each other. The flow path portion 2505 formed as described above allows cooling fluid to pass therethrough to improve the cooling performance of the stator core 200 and the coil 210.

Referring to FIG. 7, the flow path portion 2505 in an axial direction is formed along the boundary between the split cores 250. If the flow path portion 2505 is not provided, cooling fluid cannot pass through the inside of the stator core 200, so that the cooling effect of the coil 210 located on an outer diameter side of the core and the inside of the stator core 200 may be reduced. However, when the flow path portion 2505 is formed as shown in FIG. 7, the coil 210 and even the inside of the stator core 200 may be cooled. This increases a surface area of contact between the cooling fluid and the stator core 200 and allows the cooling fluid to pass through the stator core 200 without being trapped inside the slot 2502, maintaining a flow rate of the cooling fluid and eventually increasing a convective heat transfer rate. (Q (heat transfer rate)=h (convective heat transfer coefficient $\propto$ flow velocity)·A (surface area)·ΔT (temperature difference)).

Figure 8:
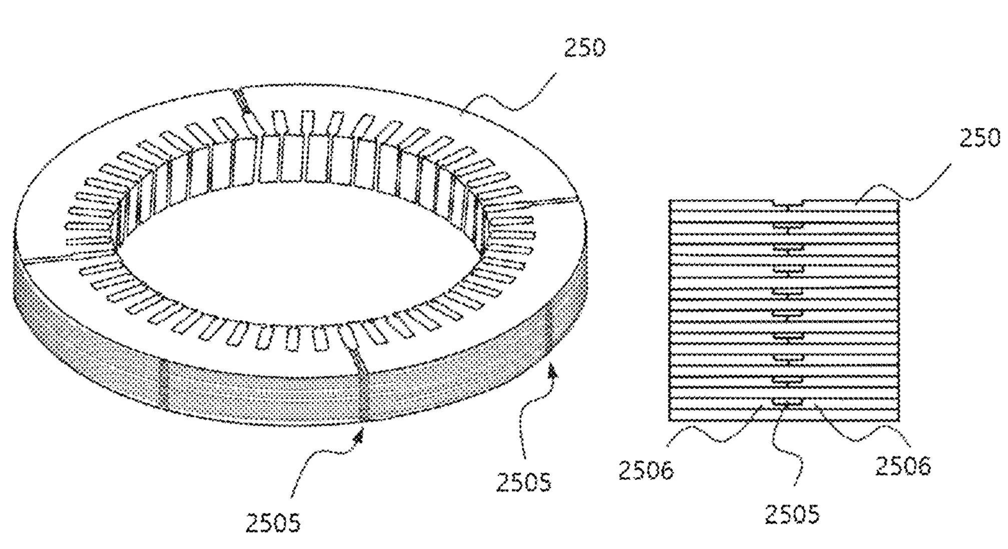
FIGS. 8 and 9 show the appearance of a split core according to another exemplary embodiment of the present invention.
Figure 9:
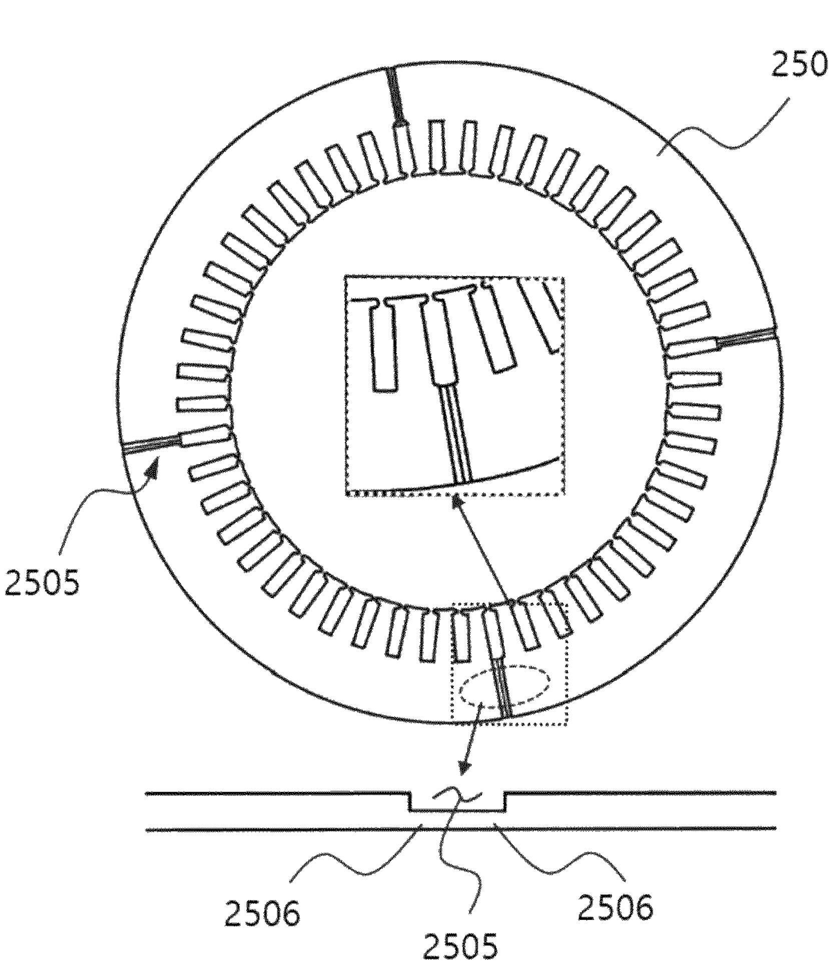

FIGS. 8 and 9 show the appearance of the split core 250 according to another exemplary embodiment of the present invention. Referring to FIGS. 8 and 9, the flow path portion 2505 may include a step 2506 formed by a groove formed in a radial direction of the yoke portion 2501, and the steps 2506 of the split cores 250 may be provided to contact each other. In the case of the split core 250 disclosed in FIG. 7, there is no portion where the split cores 250 contact each other. Accordingly, when the split cores 250 are stacked, a separate structure for positioning the split cores 250 is required for precise positioning or high precision is required for equipment for assembling the split cores 250. The exemplary embodiment disclosed in FIGS. 8 to 9 compensate for these disadvantages. As the steps 2506 of the split cores 250 contact each other, the boundaries of the split cores 250 may be closed to facilitate stacking, and a flow path through which the cooling fluid flows may be formed due to the step 2506.

Figure 10:
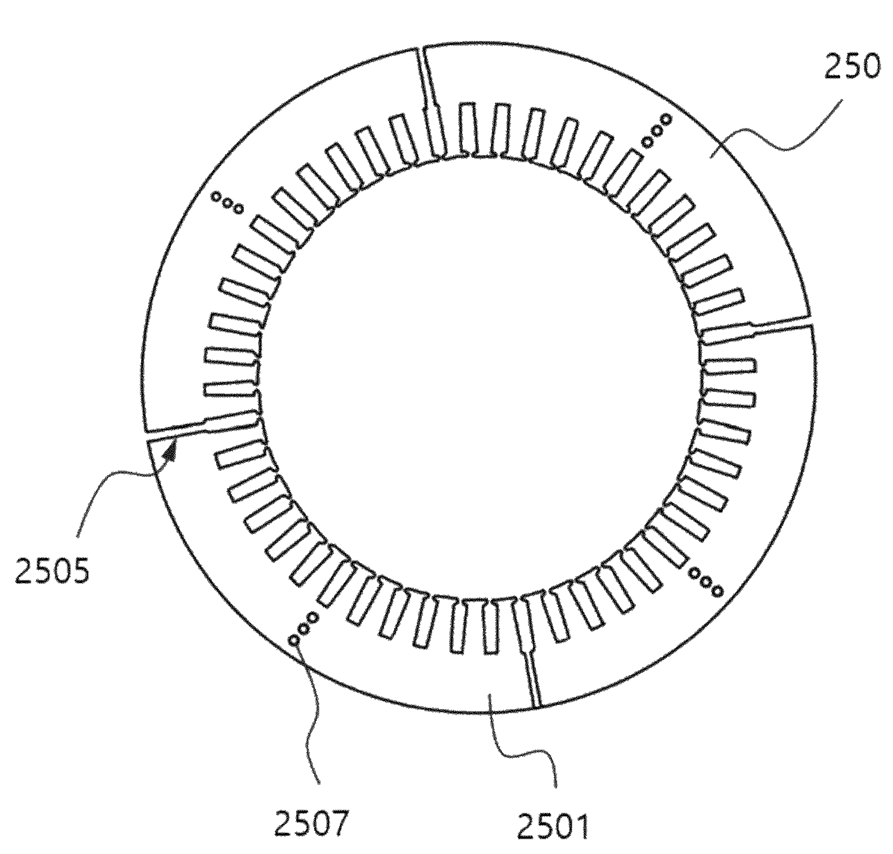
FIGS. 10 and 11 show the appearance of a split core according to another exemplary embodiment of the present invention.
Figure 11:
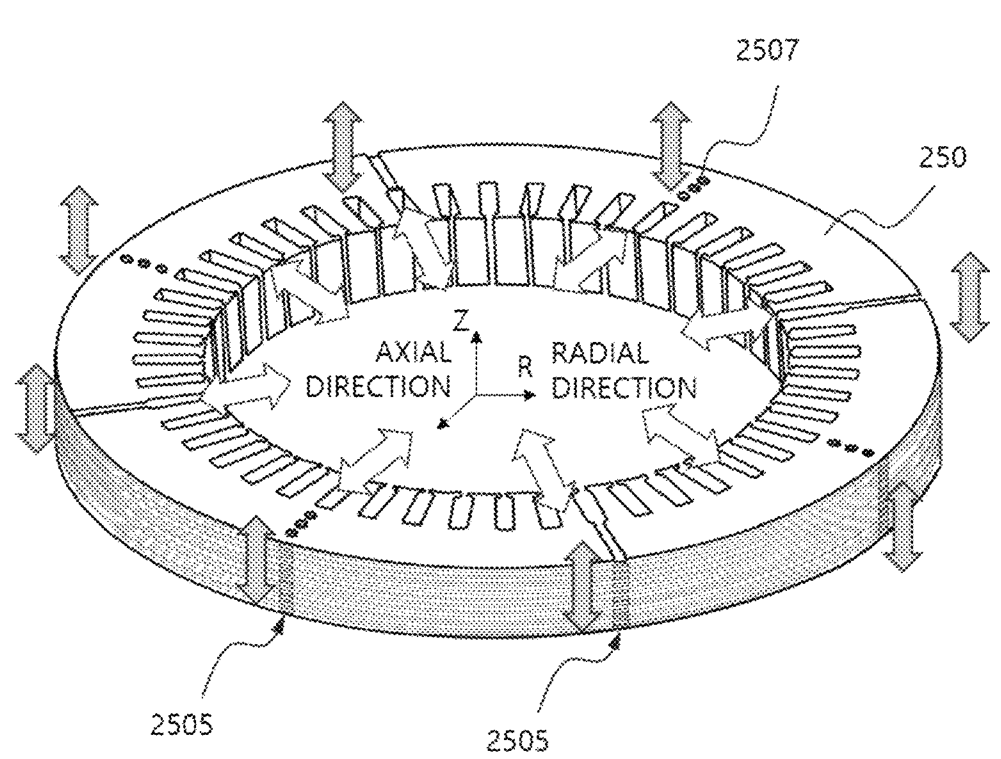

FIGS. 10 to 11 show the appearance of the split core 250 according to another exemplary embodiment of the present invention. Referring to FIG. 10, the flow path portion 2505 includes the step 2506 formed by the groove formed in a radial direction of the yoke portion 2501, and the steps 2506 of the split cores 250 contact each other, and the step 2506 may include a through-hole 2507 penetrating the step 2506 in the axial direction of the split core 250. In an example, a plurality of through-holes 2507 may be provided. In an example, a plurality of through-holes 2507 may be provided in a row in the radial direction. Referring to FIG. 11, the cooling fluid may pass through the stator core 200 in the axial direction as well, and the cooling performance may be further improved compared to the case in which only the flow path portion 2505 in the radial direction is provided.

Figure 12:
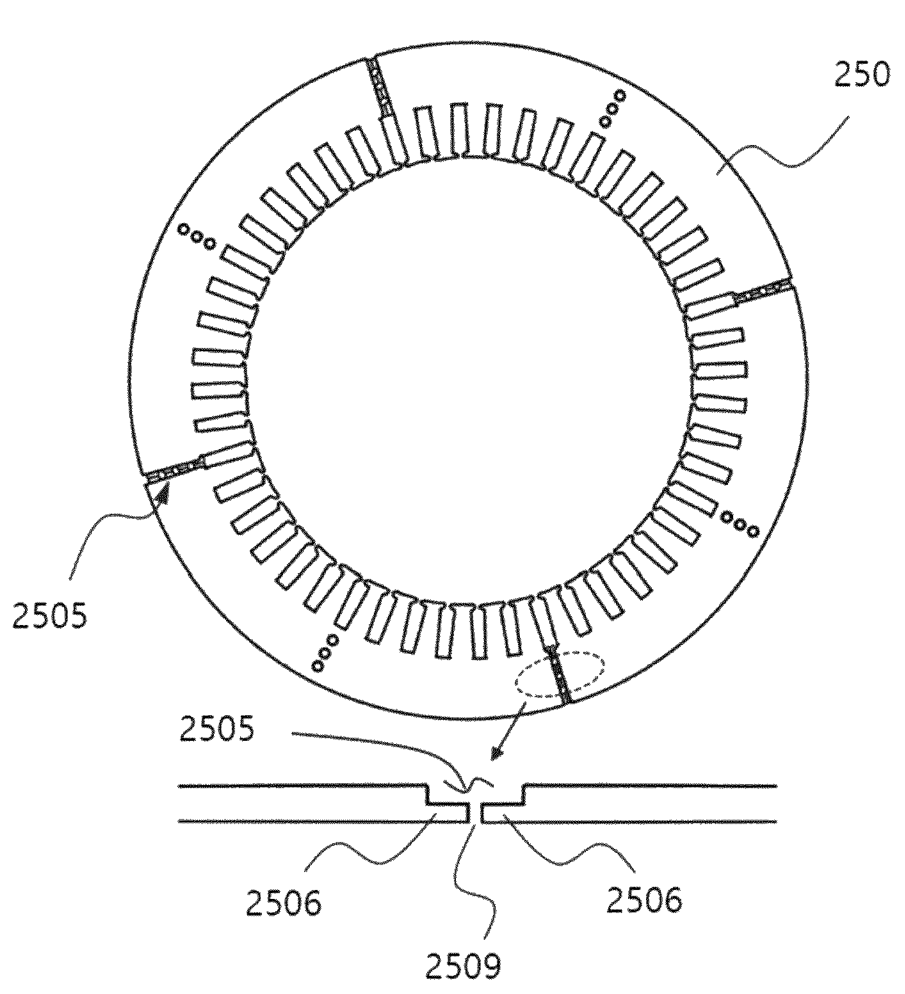
FIGS. 12 and 13 show the appearance of a split core according to another exemplary embodiment of the present invention.
Figure 13:
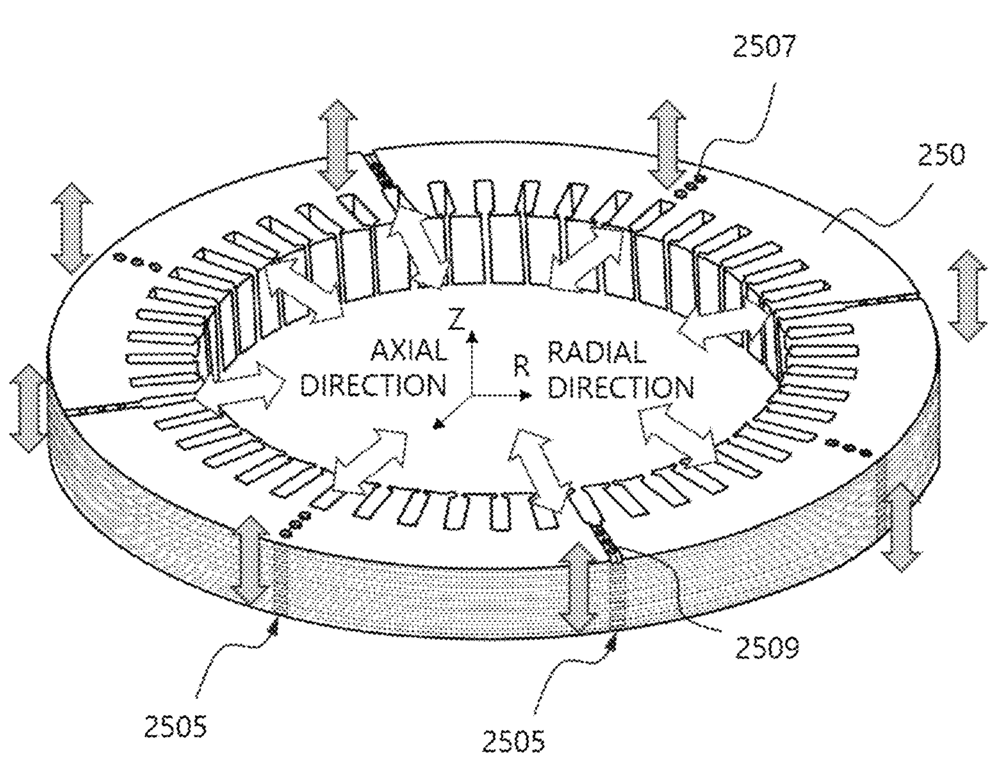

FIGS. 12 to 13 show the appearance of the split core 250 according to another exemplary embodiment of the present invention. Referring to FIG. 12, a through-hole 2509 penetrating the yoke portion 2501 in the axial direction of the split core 250 may be formed in the yoke portion 2501. In an example, a plurality of through-holes 2509 may be provided. In an example, a plurality of through-holes 2509 may be provided in a row in the radial direction. Referring to FIG. 13, the cooling fluid passes through the stator core 200 in the axial direction as well, and the cooling performance may be further improved compared to the case in which only the flow path portion 2505 in the radial direction is provided.

According to an exemplary embodiment of the present invention as described above, the entire circumference of the stator core may be efficiently cooled.

In addition, according to an exemplary embodiment of the present invention, the motor housing and the stator core may be stably coupled.

The effects of the present invention are not limited to the above-mentioned effects, and effects not mentioned will be clearly understood by those skilled in the art from this specification and the accompanying drawings.

Although the exemplary embodiments of the present invention have been described above, the exemplary embodiments disclosed in the present invention are not intended to limit the technical spirit of the present invention, but are only for explanation. Therefore, the technical spirit of the present invention includes not only each disclosed exemplary embodiment, but also a combination of the disclosed exemplary embodiments, and furthermore, the scope of the technical spirit of the present invention is not limited by these exemplary embodiments. In addition, those skilled in the art to which the present invention pertains may make many changes and modifications to the present invention without departing from the spirit and scope of the appended claims, and all such appropriate changes and modifications, as equivalents, are to be regarded as falling within the scope of the present invention.

What is claimed is:

1. A motor structure comprising:
- a cylinder-shaped motor housing having a hollow;
- a stator core accommodated inside the motor housing and including a plurality of stacked split cores including:
  - a first layer including first split cores; and
  - a second layer including second split cores, the second layer is stacked on the first layer, wherein a boundary between the first split cores and a boundary between the second split cores do not match, and each of the first and second split cores have an arc-shape and include:
    - an arc-shaped yoke portion; and
    - a plurality of teeth portions protruding from the yoke portion;
- a flow path portion at a boundary between adjacent split cores among the plurality of stacked split cores; and
- a coil wound around the plurality of teeth portions.

2. The motor structure of claim 1, wherein
- the first split cores and the second split cores are the same, and
- when an intersection angle between the first layer and the second layer is θ, a number of slots formed by combining the teeth is x, and a number of split cores constituting the first layer or the second layer is y,
- θ satisfies the following two equations, $\theta=(360^\circ/x)\times n$, $\theta+(360^\circ/y)\times n$, and n is a natural number.

3. The motor structure of claim 1, wherein the plurality of stacked split core further includes:

a third layer including third split cores, the third layer is stacked on the second layer; and a fourth layer including fourth split cores, the fourth layer is stacked on the third layer, and when viewed from above, the boundary between the first split cores and a boundary between the third split cores match, and the boundary between the second split cores and a boundary between the fourth split cores match.

4. The motor structure of claim 1, wherein the first layer and the second layer are repeatedly stacked.

5. The motor structure of claim 1, wherein the first split cores and the second split cores are identical.

6. The motor structure of claim 1, wherein the first split cores and the second split cores have different lengths.

7. The motor structure of claim 1, wherein the flow path portion penetrates from one end of the yoke portion to the other end of the yoke portion in a radial direction of the yoke portion.

8. The motor structure of claim 1, wherein the flow path portion includes a step including a groove disposed in a radial direction of the yoke portion, and steps of the split cores among the plurality of stacked split cores contact each other.

9. The motor structure of claim 8, wherein the step has a through hole penetrating the step in an axial direction of the plurality of stacked split cores.

10. The motor structure of claim 1, wherein the yoke portion has a through hole penetrating the yoke portion in the axial direction of the plurality of stacked split cores.

* * * * *